United States Patent [19]

Sternberg

[11] 4,082,157
[45] Apr. 4, 1978

[54] HIGHWAY VEHICLE WITH HYDRAULICALLY DRIVEN POWER DOLLY

[75] Inventor: Ernest R. Sternberg, Rocky River, Ohio

[73] Assignee: White Motor Corporation, Cleveland, Ohio

[21] Appl. No.: 425,207

[22] Filed: Dec. 17, 1973

Related U.S. Application Data

[63] Continuation of Ser. No. 199,290, Nov. 16, 1971, abandoned.

[51] Int. Cl.² ............................................. B62D 59/04
[52] U.S. Cl. .................................. 180/14 A; 280/421; 280/476 R
[58] Field of Search ............... 180/14 R, 14 A, 14 D; 280/407, 408, 421, 476 R; 285/DIG. 15, 137 R

[56] References Cited

U.S. PATENT DOCUMENTS

| 2,161,153 | 6/1939 | Gallun et al. ..................... 180/14 A |
| 2,447,185 | 8/1948 | Keim ................................ 280/421 X |
| 2,852,273 | 9/1958 | Hudson ............................ 280/408 X |
| 2,875,644 | 3/1959 | Mancini ........................ 180/14 R X |
| 3,170,667 | 2/1965 | Szohatsky ................... 285/DIG. 15 |
| 3,246,714 | 4/1966 | Middlesworth et al. .......... 180/14 R |
| 3,246,912 | 4/1966 | Cunha .................................. 280/407 |
| 3,293,942 | 12/1966 | Stein et al. .................... 180/14 A X |
| 3,479,055 | 11/1969 | Cunha et al. ......................... 280/407 |
| 3,612,202 | 10/1971 | Moon et al. ....................... 180/14 A |

FOREIGN PATENT DOCUMENTS

| 697,541 | 9/1953 | United Kingdom ............. 180/14 A |
| 849,257 | 9/1960 | United Kingdom ............. 180/14 R |
| 1,180,585 | 2/1970 | United Kingdom ............. 180/14 A |

*Primary Examiner*—L. J. Paperner
*Attorney, Agent, or Firm*—Watts, Hoffmann, Fisher & Heinke Co.

[57] ABSTRACT

An over-the-highway tractor-trailer vehicle including a tractor coupled in towing relationship to a forward trailer, and a dolly for towing a rearward trailer behind the forward trailer. The dolly has a hydraulically driven power unit. A hydraulic pump is driven by the tractor engine, and connects with a first set of flexible hydraulic hoses. A hydraulic motor is provided to drive the dolly, and connects with a second set of flexible hydraulic hoses. The sets of hoses releasably connect with conduits carried under the bed of the forward trailer. When the tractor is "dead headed" without a trailer or towing only one trailer, the sets of hoses are directly coupled so as to power the dolly drive.

10 Claims, 7 Drawing Figures

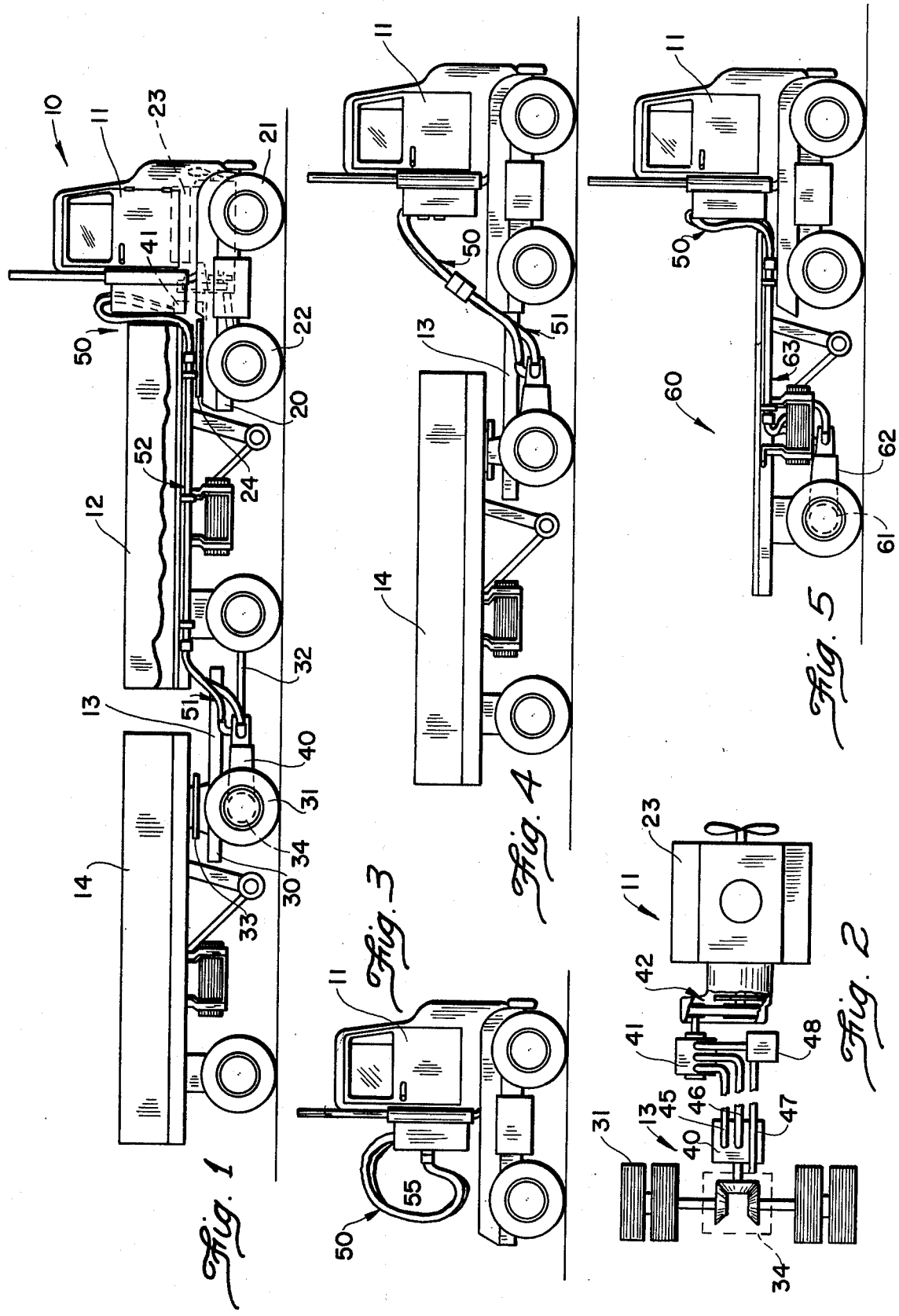

HIGHWAY VEHICLE WITH HYDRAULICALLY DRIVEN POWER DOLLY

This is a continuation of application Ser. No. 199,290 filed Nov. 16, 1971, now abandoned.

CROSS-REFERENCE TO RELATED APPLICATION

POWER DRIVE DOLLY WITH TWO-SPEED DRIVE SYSTEM, Ser. No. 175,131 filed Aug. 26, 1971, by Heinrich H. Ziegele, now U.S. Pat. No. 3,888,142.

BACKGROUND OF THE INVENTION

1. Field of the Invention

The present invention relates to an over-the-highway vehicle and more particularly to an over-the-highway vehicle with a hydraulically driven power dolly.

2. Prior Art

Over-the-highway tractor-trailer rigs including a pair of trailers towed in tandem one behind the other have gained increasing acceptance as more and more states have legalized their use on turnpikes and highways of the interstate system. In fact, triples, that is rigs with three trailers, are now being used in some areas. In operational form, the tandem rig ordinarily comprises a relatively short tractor carrying a fifth wheel which couples with the forward trailer, and a dolly towed by the forward trailer and carrying another fifth wheel which couples with the rearward trailer.

In order to increase the traction and load hauling capacity of such tandem trailer combinations, proposals have been made for powering the dolly. One such proposal has been to provide the dolly with a power unit entirely separate from the tractor-carried power unit. Another approach has been to provide the dolly with a drivable axle, and couple the axle by a mechanical drive linkage to the tractor power unit.

One disclosure of the separate dolly engine approach is a paper by Norman B. Chew entitled "The Power Dolly Approach to Highway Transportation" submitted in October, 1965 at the Society of Automotive Engineers Combined Powerplant and Transportation Meeting in Cleveland, Ohio. One problem encountered with such separate dolly engine designs is that of controlling the dolly engine. Unless the power output of the dolly engine is regulated in accordance with the power output of the tractor engine, braking and jackknife problems may be created. Other problems arise in conjunction with the cost of providing and operating an entirely separate and distinct power unit.

The tractor-driven power dolly approach is disclosed in the referenced application. A drivable axle on the dolly is coupled by means of a flexible drive shaft to the tractor engine. While such an approach has the advantage of controlling the power output of the dolly in accordance with the output of a single prime mover, namely the tractor engine, it poses problems in conjunction with the delivery of power from the prime mover along the forward trailer to the dolly. Flexible mechanical drive couplings extending the entire length of a trailer are expensive and difficult to store. The positioning and connection of such couplings each time a trailer is added or dropped off is time consuming and costly.

SUMMARY OF THE INVENTION

The present invention overcomes the foregoing drawbacks of the prior art and provides an over-the-highway tractor-trailer vehicle with a dolly equipped with a power driven axle. The power supplied to the dolly axle is supplied by the tractor engine. The power connection between the engine and the dolly includes a removable section so that the dolly can be selectively connected directly to the tractor or, with the removable section in place, to the rear of a trailer for pulling another trailer.

The engine-to-dolly power connection includes a hydraulic pump driven by the tractor engine. A hydraulic motor is carried by the dolly and arranged to drive the axle of the dolly. Hydraulic conduits installed beneath the forward trailer form the removable section of the engine-to-dolly connection. These conduits are provided with quick-disconnect couplers to facilitate establishing the driving connection between the pump and the motor. Hydraulic hoses connecting with the pump and the motor may be coupled to these hydraulic lines when forward and rearward trailers are being towed, or may be coupled directly together when only a rearward trailer is being towed or when there is no trailer at all.

Such an arrangement provides a power dolly having an output which is regulated in accordance with the power output of the tractor engine. The only modification that needs to be made in standard tandem trailer structures to equip them for use with the drive system of the present invention is to mount a set of hydraulic conduits beneath the bed of the forward trailer.

The tractor-carried hydraulic pump is preferably driven from a flywheel power-take-off. This arrangement has the advantage that the driving power exerted by the dolly will be proportional to the engine speed or power output of the tractor engine. Accordingly, braking and jackknife problems caused by a dolly engine operating at excessive speeds is obviated.

Tractors which are equipped with the hydraulic drive pump may be used in conjunction with other specially designed trailers having hydraulic motor driven axles, as well as with power dollies. Logging trailers, for instance, may be provided with one or more hydraulic motor driven axles to improve vehicle traction in muddy terrain. Hydraulic conduits positioned under the trailer bed and connected to the hydraulic motor are releasably coupled to the tractor-carried hydraulic hoses to energize the motor.

In the preferred embodiment of the present invention, three hydraulic lines extend between the tractor and the power dolly. Two of these lines provide for the high pressure supply and the low pressure return of hydraulic fluid between the pump and the motor. The third line comprises a control conduit, the pressure within which is varied to effect upshifting and downshifting of the dolly drive axle.

In order to prevent the coupling of the wrong hydraulic hoses and conduits, special quick-release couplers are provided which can be connected only in the correct fashion. In one embodiment, three different types or sizes of incompatible couplers are used, whereby incorrect connection is prevented. In another embodiment, identical couplers are supported by mating brackets which can only be assembled so as to correctly connect the conduits.

Accordingly, it is a broad general object of the present invention to provide a novel and improved over-the-highway vehicle including a conventional and an auxiliary drive coupled in parallel to a single prime mover.

It is another object to provide such a vehicle including a hydraulically driven power dolly.

Other objects and a fuller understanding of the invention may be had by referring to the following description and claims taken in conjunction with the accompany drawings.

BRIEF DESCRIPTION OF THE DRAWINGS

FIG. 1 is a side elevational view of an over-the-highway tractor-trailer vehicle employing a hydraulically driven power dolly;

FIG. 2 is a schematic plan view of the drive system employed to power the hydraulic motor of the dolly;

FIG. 3 is a side elevational view of the tractor of FIG. 1 disengaged from the trailers;

FIG. 4 is a side elevational view of the tractor and power dolly pulling a single trailer;

FIG. 5 is a side elevational view of the tractor coupled to a trailer specially designed for increased traction;

DESCRIPTION OF THE PREFERRED EMBODIMENT

Figure 6:
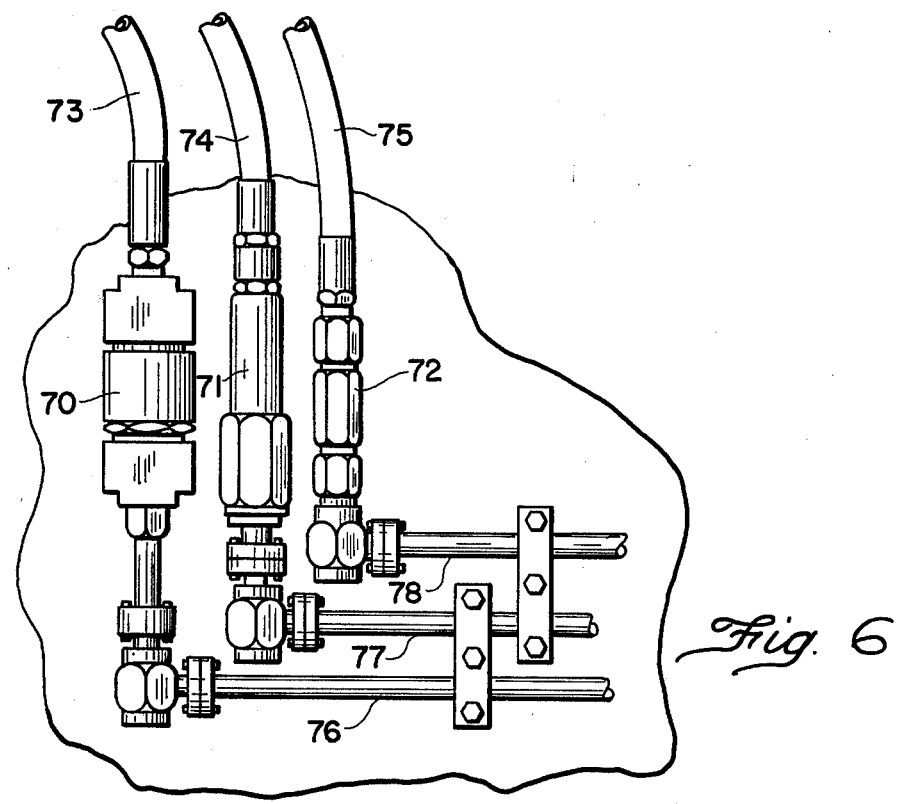
FIG. 6 is an elevational view of one system of hydraulic couplers used to couple the hoses and conduits of the drive system; and, FIG. 7 is an elevational view of another system of hydraulic couplers which may be used to couple the hoses and conduits.

Referring to FIG. 1, an over-the-highway tractor-trailer vehicle is shown generally at 10. A tractor 11 is coupled in towing relationship with a forward trailer 12, a dolly 13, and a rearward trailer 14.

The tractor 11 includes a frame structure 20 supported on forward and rearward road engaging wheels 21, 22. An engine 23 carried by the frame structure 20 is coupled in driving relationship through a suitable transmission assembly, not shown, to the rearward wheels 22. A fifth wheel 24 connects the tractor frame with the forward trailer 12.

The dolly 13 includes a frame structure 30 supported on road engaging wheels 31. A hitch assembly 32 couples the dolly to the forward trailer 12. A fifth wheel 33 carried by the dolly frame couples the dolly to the rearward trailer 14.

The dolly 13 is preferably provided with a two-speed drivable axle 34 which may be selectively upshifted, and downshifted, and shifted into neutral. A power dolly with such a two-speed drivable axle is described in the referenced application.

In order to power the drivable dolly axle, the present invention provides a hydraulic drive system including a hydraulic motor 40 carried by the dolly, and a hydraulic pump 41 carried by the tractor. Hydraulic connection is provided between the pump and the motor by means of a series of flexible hoses and rigid conduits which will be described in greater detail.

Referring to FIG. 2, the hydraulic drive system of the present invention is illustrated schematically. The hydraulic drive system is designed so as to power the drivable dolly axle in proportion to the speed of the engine 23. The output of the motor 40 is proportional to the flow rate of hydraulic fluid therethrough. The rate of flow hydraulic fluid circulated through the motor is proportional to the output of the pump 41 which, in turn, is proportional to the speed of the pump. The pump, in turn, is driven through a flywheel power-take-off 42 so as to operate at a speed which is proportional to that of the engine.

Three hydraulic lines, generally indicated in FIG. 2 by the numerals 45, 46 and 47 extend between the tractor 11 and the dolly 13. The first two hydraulic lines 45, 46 run between the motor 40 and the pump 41 to provide for the high pressure supply and the low pressure return of hydraulic fluid between the pump and the motor. The third hydraulic line 47 comprises a control conduit the pressure within which is varied to effect upshifting and downshifting of the dolly drive axle 34. A controller, generally indicated by the numeral 48, is provided on the tractor for selectively changing the control conduit pressure to upshift and downshift the drive axle 34.

The referenced application describes one possible controller embodiment for effecting upshifting and downshifting of a two speed dolly drive axle. As will readily be apparent, the means for transmitting the control signal between the tractor and the dolly need not be hydraulic but can also be electrical or mechanical as is thought to be most beneficial.

One advantage of controlling the shifting of the dolly drive axle hydraulically is that the only modification that need be made in the forward trailer to transmit the control signal therealong is to provide a control conduit beneath the bed of the trailer. Since supply and return conduits are also employed in the preferred embodiment to connect the pump and motor, the entire modification of the forward trailer is accomplished by attaching a set of three hydraulic conduits along the trailer frame beneath the bed.

Another advantage of hydraulically controlling the dolly drive axle is the ease with which the control connection can be made between the tractor and the dolly. Quick-release hydraulic couplings provided on the supply, return and control lines are simply snapped together, whereby the need for other electrical control connections, etc. is obviated.

The hydraulic lines which connect with the tractor and the dolly comprise three separate sets of conduits. A first set 50 of flexible hydraulic hoses connects at one end with the pump 41. A second set 51 of flexible hydraulic hoses connects at one end with the motor 40. The other ends of each of the sets of hoses 50, 51 connect with a third set of conduits 52 disposed along the forward trailer 12. Quick-release hydraulic couplers, which will be described in greater detail, are provided between the sets of conduits.

When the tractor 11 is detached from the trailers 12, 14 and from the dolly 13, the first set of hoses 50 are coiled, as shown in FIG. 3, and the free ends connected with dummy connectors 55 to keep dust and debris away from the quick-release connectors carried on the hoses 50.

When one of the trailers 12, 14 is dropped off leaving the tractor to pull the dolly 13 and the other trailer, the dolly is coupled to the tractor as shown in FIG. 4. The dolly may be designed for nesting connection to the tractor as is known in the art. The first and second sets of hoses 50, 51 are directly connected together, as shown in FIG. 4. Effectively the coupling of the tractor and the power dolly converts the tractor from a single to a tandem axle tractor with, unlike the prior art, both axles powered.

Tractors equipped with the hydraulic pump auxiliary drive system are also usable in conjunction with specially designed trailers having drivable axles. Referring to FIG. 5, a trailer 60 is shown having a drivable rear axle 61. A hydraulic motor 62 is coupled to the axle 61 in driving relationship. Hydraulic lines, indicated generally by the numeral 63, connect with the motor 62 and extend forwardly along the trailer 60 for connection with the hoses 50. By this arrangement, the traction of the tractor-trailer rig is increased without the provision of an auxiliary power dolly. Such specially designed trailers are particularly useful in the muddy environment of logging operations.

Figure 7:
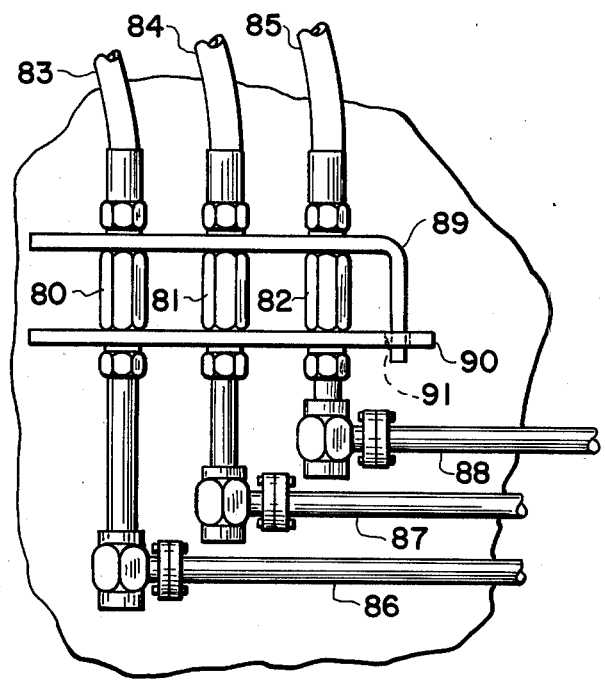

In FIGS. 6 and 7, two alternate arrangements of quick-release hydraulic connectors are shown for coupling the previously described sets of hydraulic lines. One problem which must be overcome is that of mistakenly connecting the wrong hydraulic lines together, as this could cause serious damage. In the embodiment of FIG. 6, quick-release hydraulic couplers 70, 71, 72 of incompatible configuration are employed to connect hoses 73, 74, 75 to conduits 76, 77, 78. The couplers 70, 71, 72 can either be of different sizes or of different design, so long as it is impossible to improperly connect the hoses and conduits.

In the embodiment of FIG. 7, identical quick-release couplers 80, 81, 82 connect hoses 83, 84, 85 with conduits 86, 87, 88. The hose side of the couplers are mounted on an L-shaped bracket 89. The conduit side of the couplers are mounted on a bracket 90 having an aperture 91. Incorrect connection of the conduits and hoses is prevented since they can only be connected when the L-shaped bracket 89 projects through the aperture 91.

Although the invention has been described in its preferred form with a certain degree of particularity, it is understood that the present disclosure of the preferred form has been made only by way of example and that numerous changes in the details of constructiom and the combination and arrangement of parts may be resorted to without departing from the spirit and the scope of the invention as hereinafter claimed.

What is claimed is:

1. A hydrostatic assist drive for a tractor trailer which drives the wheels of the trailer to assist the main tractor drive, comprising:
   (a) a hydraulic pump unit;
   (b) a hydraulic motor unit;
   (c) conduit means for conveying fluid from the pump to the motor;
   (d) means for varying the displacement of one of said units;
   (e) a shiftable plural range axle drive between the trailer wheels and driven by said motor unit; and
   (f) control means for shifting said axle to select the drive range of the axle drive.

2. A hydrostatic assist drive as defined in claim 1, wherein said axle drive has a low range and high range, said control means being operative to shift the axle drive from a low range to a high range.

3. The hydrostatic assist drive of claim 1 wherein:
   a. said control means includes a controller connected to said plural range axle for providing a variation in a control signal; and,
   b. said axle is responsive to variations in said control signal to select the range of the axle drive.

4. The over-the-highway vehicle of claim 3 wherein said controller is a fluid pressure controller, said conduit means includes a control conduit interconnecting said controller and said axle for providing a variation in fluid pressure in said control conduit, and said axle is responsive to variations in said control conduit fluid pressure to select the range of the axle drive.

5. An over-the-highway vehicle, comprising
   (a) releasably connectable tractor and dolly frames supported on tractor and dolly road wheels respectively;
   (b) said tractor having a prime mover coupled in driving relationship to certain of said tractor road wheels and coupled in parallel driving relationship through a power transmitting means to certain of said dolly road wheels;
   (c) said power transmitting means including a hydraulic pump unit, a hydraulic motor unit, conduit means for conveying fluid from the pump unit to the motor unit, means for varying the displacement of one of said units, a shiftable plural range axle between said certain dolly road wheels, driven by said motor unit, and coupled to said certain dolly road wheels, and control means for shifting said plural range axle to select the range of the axle drive.

6. The vehicle of claim 5 wherein said means for varying displacement includes a flywheel power-take off drivingly coupling said hydraulic pump unit to said prime mover such that the displacement of said pump varies in accordance with the speed of said prime mover.

7. The vehicle of claim 5 wherein said frames are provided with coupling means for releasably rigidly coupling said dolly frame to said tractor frame.

8. The vehicle of claim 5 wherein said conduit means comprises:
   a. a first set of flexible hydraulic hoses connecting at one end with said pump;
   b. a second set of flexible hydraulic hoses connecting at one end with said motor; and,
   c. releasably hydraulic couplers connected to the other ends of said first and second sets of hoses such that said sets may be coupled together to establish a driving connection between said pump and said motor.

9. The vehicle of claim 8 wherein each of said sets of hydraulic hoses comprise a plurality of hoses, and said hydraulic couplers are so formed as too prevent the connection of inappropriate ones of the pump hoses and motor hoses.

10. The vehicle of claim 8 additionally including a forward and a rearward trailer, said tractor being coupled to said forward trailer in towing relationship, said forward trailer being coupled to said dolly in towing relationship and said dolly being coupled to said rearward trailer in towing relationship, and said conduit means further including hydraulic conduit means carried by said forward trailer and having releasable hydraulic couplers for connection with the releasably hydraulic couplers carried on said sets of hoses, whereby hydraulic communication is established through said conduit means between said pump and said motor.

* * * * *